United States Patent
Yamaguchi et al.

[11] Patent Number: 5,577,242
[45] Date of Patent: Nov. 19, 1996

[54] SYSTEM FOR BATCH TRANSFER FILE MANAGEMENT USING A LIST TO ORGANIZE A BATCH OF BLOCKS INTO BUFFERS

[75] Inventors: Satoru Yamaguchi; Yutaka Ito; Naoya Matsumoto; Yoshihiro Morita; Katsumi Yagita, all of Kawasaki, Japan

[73] Assignee: Fujitsu Limited, Kawasaki, Japan

[21] Appl. No.: 115,137

[22] Filed: Sep. 1, 1993

[30] Foreign Application Priority Data

Nov. 25, 1992 [JP] Japan .................................... 4-315365

[51] Int. Cl.$^6$ .................................................. G06F 17/30
[52] U.S. Cl. .................... 395/621; 364/DIG. 1; 364/222.81; 364/246.3; 364/239
[58] Field of Search ........................ 395/600, 275

[56] References Cited

U.S. PATENT DOCUMENTS 4,935,869  6/1990  Yamamoto .......................... 395/600
5,237,682  8/1993  Bendert et al. ...................... 395/600
5,339,413  8/1994  Koval et al. ......................... 395/650

Primary Examiner—Thomas G. Black
Assistant Examiner—Wayne Amsbury
Attorney, Agent, or Firm—Staas & Halsey

[57] ABSTRACT

A storage section stores therein one or more files each composed of a plurality of data blocks each having a constant length. A plurality of buffers are provided corresponding to the plurality of blocks. A batch block demand section generates a batch block input demand for batch inputting the plurality of blocks of the storage section. A batch transfer processing section performs an input process of the plurality of blocks between the batch block demand section and the plurality of blocks, and at the same time performs the input process of the plurality of blocks between the plurality of buffer and the storage section.

18 Claims, 10 Drawing Sheets

SYSTEM FOR BATCH TRANSFER FILE MANAGEMENT USING A LIST TO ORGANIZE A BATCH OF BLOCKS INTO BUFFERS

BACKGROUND OF THE INVENTION

1. Field of the Invention

The present invention relates to a file management method and apparatus for accessing a file system formed in a storage device, such as a secondary storage device, for a computer, and inputting file information into or outputting file information from the file system.

2. Description of the Related Art

In a conventional file management system, in the case where a demand for data input/output is provided from an application section, i.e., a central processing unit (CPU) for executing an application software to, for example, a secondary storage device for forming a file system having a plurality of files, a data input/output process of the desired file of the secondary storage device is carried out as follows:

When the application section outputs data to a secondary storage device such as a disk device, an output demand from the application section is output to a buffer. Subsequently, data having a constant length of block are transferred from the application section to the buffer. When the transfer of one block data has been completed, the one block of data is transferred and stored from the buffer to the storage device.

Further, in the case where the application section outputs a next block of data, an output demand from the application section is again output to the buffer, and a like output process is carried out.

On the other hand, when the application section receives data from the storage device, a block of data is input into the buffer in response to an input demand from the application section. When the data corresponding to one block are written in the buffer, the data corresponding to the one block are input from the buffer to the application section. In the case where a next block of data are received by the application section, an input demand from the application section is provided to the buffer, and the like input process is carried out.

As described above, in the conventional file management system, in the case where the storage device into which the files are stored is, for example, a disk device, when a plurality of serial blocks which are present on a track are input/output processed, the input/output demand is executed for every block (every time) from the application section.

In addition, due to an overhead of address operation of blocks relative to the input/output demand from the application section, time for waiting for the rotation of the disk is needed. For this reason, in the conventional system, it is impossible to access the files at a high speed.

Conventionally, to cope with this problem, the block length has been elongated and the input/output demand has been executed in the enlarged block unit, to reduce the number of input/output demands and the rotation waiting times. Thus, it is possible to carry out the file access at a high speed to some extent by elongating the block length.

However, in general, the block length is determined at the time the file is produced. For this reason, in order to achieve the high speed access to the file by the enlargement of the block length, it is necessary to carry out work for transferring the original data to the file system in which the enlarged blocks are to be used. The work for transferring the data is, for example, copying, moving, restoring and the like.

When the data are to be block-processed, if a region which could not reach the block size is left in the storage device, it is impossible to effectively use the block. In the case where the block length is enlarged, the region which could not be used is left in the storage device is increased in accordance with an enlarged size of the blocks. In this case, the region which could not be effectively used is increased in the storage device. Moreover, it is necessary to provide a buffer (enlarged buffer) corresponding to the size of the block length.

After the file system has been initialized, blocks are registered in an optimum arrangement for the storage device in a management information region (which will be hereinafter referred to as "blank management information section") for managing blank blocks in the file system. For instance, in the case where a single file is created or the file is deleted, there is a high possibility that the optimum arrangement of the blocks of the blank management information section might be insured.

However, for instance, when the creation and deletion of a plurality of files have been frequently executed, the order of obtaining the blocks and the order of the release of the blocks would be unstable. For example, assuming that the condition where the blocks are in series; that is, the numbers of the blocks are serial be optimum in arrangement, as shown in FIG. 1, when the blocks are release processed, the blocks B2, B1 and B3 to be managed by the file management information section are released, and the block numbers are registered into the blank management information section without any modification irrespective of the order of the block number. For this reason, the numbers of the blocks in the blank management information section are arranged at random as shown in FIG. 1.

As shown in FIG. 2, when the blocks are picked up and processed, the blocks B2, B1 and B3 of the blank management information section are obtained in this order (without serial block number arrangement). For this reason, the numbers of the blocks of the blank management information section are arranged at random as shown in FIG. 2.

Thus, when the creation and deletion of the plurality of files have been repeated, the number of the pickup order of the blocks and the release order of the blocks are not serial and the optimum block arrangement could not be insured.

SUMMARY OF THE INVENTION

An object of the present invention is to provide a file management method and apparatus for enabling a high speed access to files without enlarging a size of a file block.

In a file management system according to the present invention, it high speed access to the files is performed by a plural block batch input, without changing a size of the block length of the file system.

The file management system according to the present invention has a batch transfer demand section, a batch transfer processing section, a storage section and a plurality of buffers.

The storage section stores therein files formed of a plurality of data blocks each of which is composed of data having a predetermined length. The batch transfer demand section generates batch transfer demands for batch inputting the block data from the storage section and/or batch outputting the block data to the storage section. On the basis of the batch transfer demand of the batch transfer demand section, the batch transfer processing section performs the data transfer process of the plurality of blocks between the batch transfer demand section and said plurality of buffers and at the same time the data transfer process thereof between the plurality of buffers and the storage section.

The plurality of data blocks are batch input/output by the batch transfer demand section and the batch transfer processing section.

The batch transfer processing section may include a blank buffer arithmetic section and a buffer gain section. The blank buffer arithmetic section calculates a number of blank buffers of the plurality of buffers for gaining the plurality of buffers which are actually needed for inputting the data of the plurality of blocks in the manner in accordance with the batch block input demand in the batch transfer demand section. The buffer gain section gains the buffers corresponding to the buffer number calculated by the blank buffer arithmetic section and performs an input process of the corresponding data blocks into the gained buffers, respectively.

Also, the batch transfer processing section may include a blank buffer arithmetic section and a buffer gain section. The blank buffer arithmetic section calculates a number of blank buffers of the plurality of buffers for gaining the plurality of buffers which are actually needed for outputting the data of the plurality of blocks in the manner in accordance with the batch block output demand in the batch transfer demand section. The buffer gain section gains the buffers corresponding to the buffer number calculated by the blank buffer arithmetic section and performs an output of the corresponding data blocks into the gained buffers, respectively.

The blank buffer arithmetic section may regard as the buffer number for the batch process a buffer number obtained by dividing the calculated blank buffer number by a process number.

The system includes a blank management section for managing an arrangement of blank blocks in the storage device in accordance with blank management information, a determining section for determining characteristics of the storage device and a management information control section for rearranging the blank management information managed by the blank management section for an optimum arrangement of individual blocks in response to characteristics determined in the determining section, when one of block gain and release operations is attained by the batch transfer section.

If the transfer demand is provided from the batch transfer section, the batch transfer processing section writes the write data into the plurality of buffers in order and manages the buffer number every time. The determining section determines whether or not the written buffer number is larger than the buffer number calculated by the blank buffer arithmetic section. A listing section lists the blocks into the buffers if the determining section determines that the written buffer number is larger than the calculated buffer number. The output section batch outputs, into the storage device, the plurality of blocks formed in a list structure by the listing section.

The batch transfer demand section may be, for example, an application section for executing an application program. The storage device may be, for example, a disk device such as a hard disk device, a floppy disk device and a magneto-optical disk device.

According to the present invention, when the batch transfer demand section effects a batch transfer demand for batch inputting/outputting the plurality of blocks of the storage device, the batch transfer processing section performs the input/output process of the plurality of blocks between the batch transfer section and the plurality of buffers and at the same time, performs the input/output process of the plurality of blocks between the plurality of buffers and the storage device on the basis of the batch transfer demands of the batch demand section.

Specifically since it is possible to carry out the batch input/output process of the plurality of blocks in accordance with one input/output demand, the files are accessed at a high speed. Accordingly, the reduction of the number of times of the input/output demands and the number of times for waiting for the rotation of the disk (overhead time) are realized.

The blank management section manages the arrangement of the blank blocks on the file system in accordance with the management information and the determining section determines the characteristics of the storage device or section. Since a management information controlling section rearranges the blank management information to be managed by the blank management section for attaining an optimum arrangement of the individual blocks in correspondence with the characteristics determined by the determining section in the case where the batch transfer processing section effect the gain/release of the blocks, the optimum arrangement of the blocks is obtained to thereby shorten an input/output period of time in access to the files.

According to the present invention, a high speed access to the files is attained by the batch input/output of the plurality of blocks without enlarging the block length of the file system and without changing the present available file system. It is thus possible to dispense with the reformation of the file systems or the transfer work of the file systems. Furthermore, since it is possible to change the unit of the input/output by adjusting the buffer number, it is possible to perform an optimum adjustment of performance.

Also, since the blank management information of the file system is rearranged for the optimum arrangement of the individual blocks in response to the characteristics of the storage device, it is possible to perform a higher speed access to the files.

DETAILED DESCRIPTION OF THE PREFERRED EMBODIMENTS

A file management system in accordance with embodiments of the invention will now be described with reference to the accompanying drawings.

Figure 1:
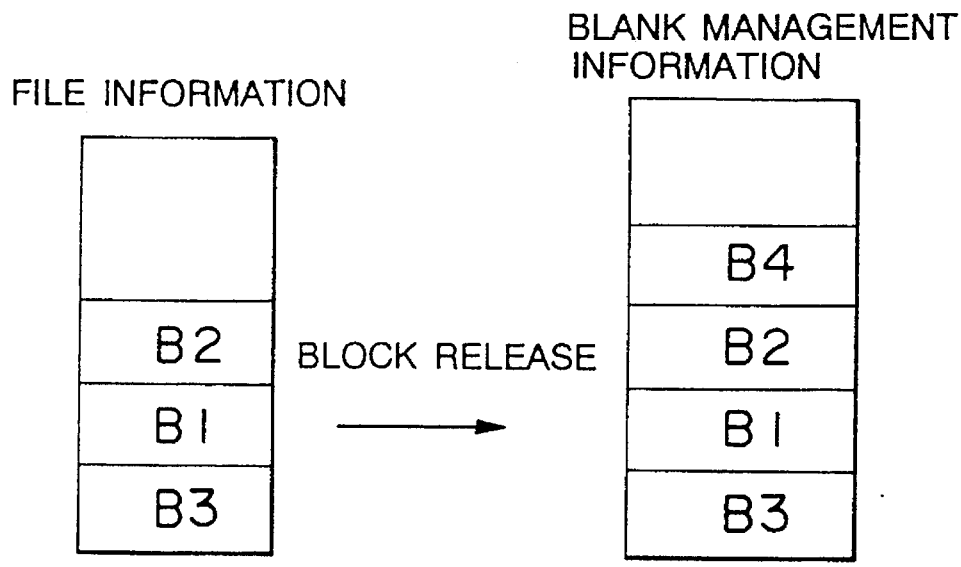
FIG. 1 is a schematic diagram showing a concept of releasing or opening the blocks in a conventional file management system.
Figure 2:
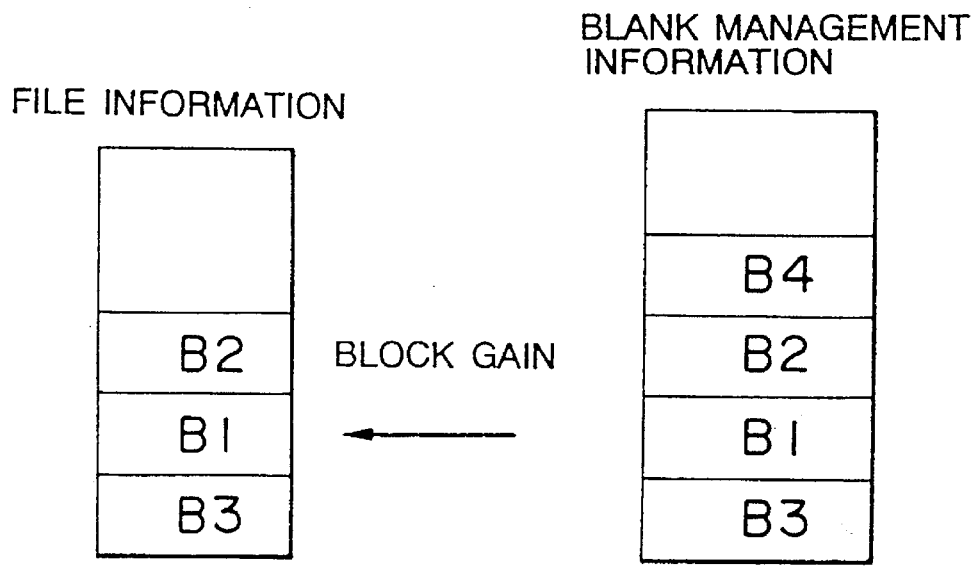
FIG. 2 is a schematic diagram showing a concept of obtaining or gaining blocks in a conventional file management system.
Figure 3:
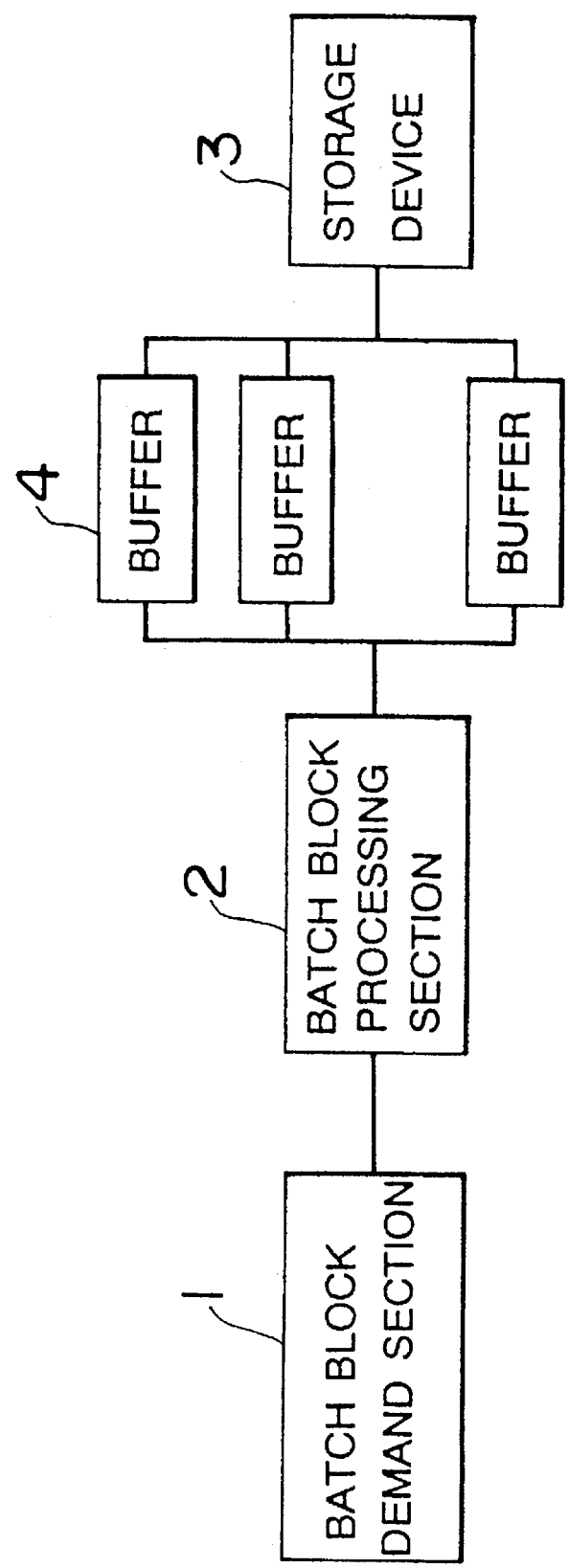
FIG. 3 is a block diagram showing a structure of a file management system according to a first embodiment of the invention.

FIG. 3 shows a concept of a file management system in accordance with a first embodiment of the invention.

The file management system shown in FIG. 3 is provided with a batch block demand section 1, a batch block processing section 2, a storage device 3 and a plurality of buffers 4 corresponding to a plurality of blocks.

The storage device 3 stores therein one or more files each composed of a plurality of data blocks each formed of a constant length of data. The batch block demand section 1 produces a batch block input demand for batch inputting the plurality of block data of the storage device 3. The batch block processing section 2 processes input of the plurality of blocks between the batch block demand section 1 and the plurality of buffers 4 on the basis of a batch block input demand of the batch block demand section 1 and at the same time processes input of the plurality of blocks between the plurality of buffers 4 and the storage device 3.

Also, the batch block demand section 1 generates a batch block output demand for batch outputting the plurality of blocks of the storage device 3. The batch block processing section 2 processes output of the plurality of blocks between the batch block demand section 1 and the plurality of buffers 4 on the basis of a batch block output demand of the batch block demand section 1 and at the same time processes output of the plurality of blocks between the plurality of buffers 4 and the storage device 3.

The batch block demand section 1 may be, for example, a section for executing the application program. The storage device 3 may be a disk device such as a floppy disk device, a hard disk device, a magneto-optical disk and the like.

With such an arrangement, since the batch block demand section 1 inputs a plurality of blocks of the storage device 3 in a batch manner, when the batch block input demand is executed, the batch block processing section 2 carries out the input process of the plurality of blocks between the batch block demand section 1 and the plurality of buffers 4, and at the same time carries out the input process of the plurality of blocks between the plurality of buffers 4 and the storage device 3.

Since the batch block demand section 1 outputs a plurality of blocks of the storage device 3 in a batch manner, when the batch block output demand is executed, the batch block processing section 2 carries out the output process of the plurality of blocks between the batch block demand section 1 and the plurality of buffers 4, and at the same time carries out the output process of the plurality of blocks between the plurality of buffers 4 and the storage device 3.

As stated above, since a plurality of blocks may be batch input or output processed in accordance with one input demand or output demand, it is possible to access the files at a high speed. It is therefore possible to reduce the numbers of times of input/output demands and the overheads of, for example, waiting for the disk rotation.

Thus, without enlarging the block length of the file system and without changing the available file system, it is possible to realize a high speed access to the files by the batch input/output of a plurality of blocks. Accordingly, it is possible to dispense with reformation of the file system and transfer work therefor.

Figure 4:
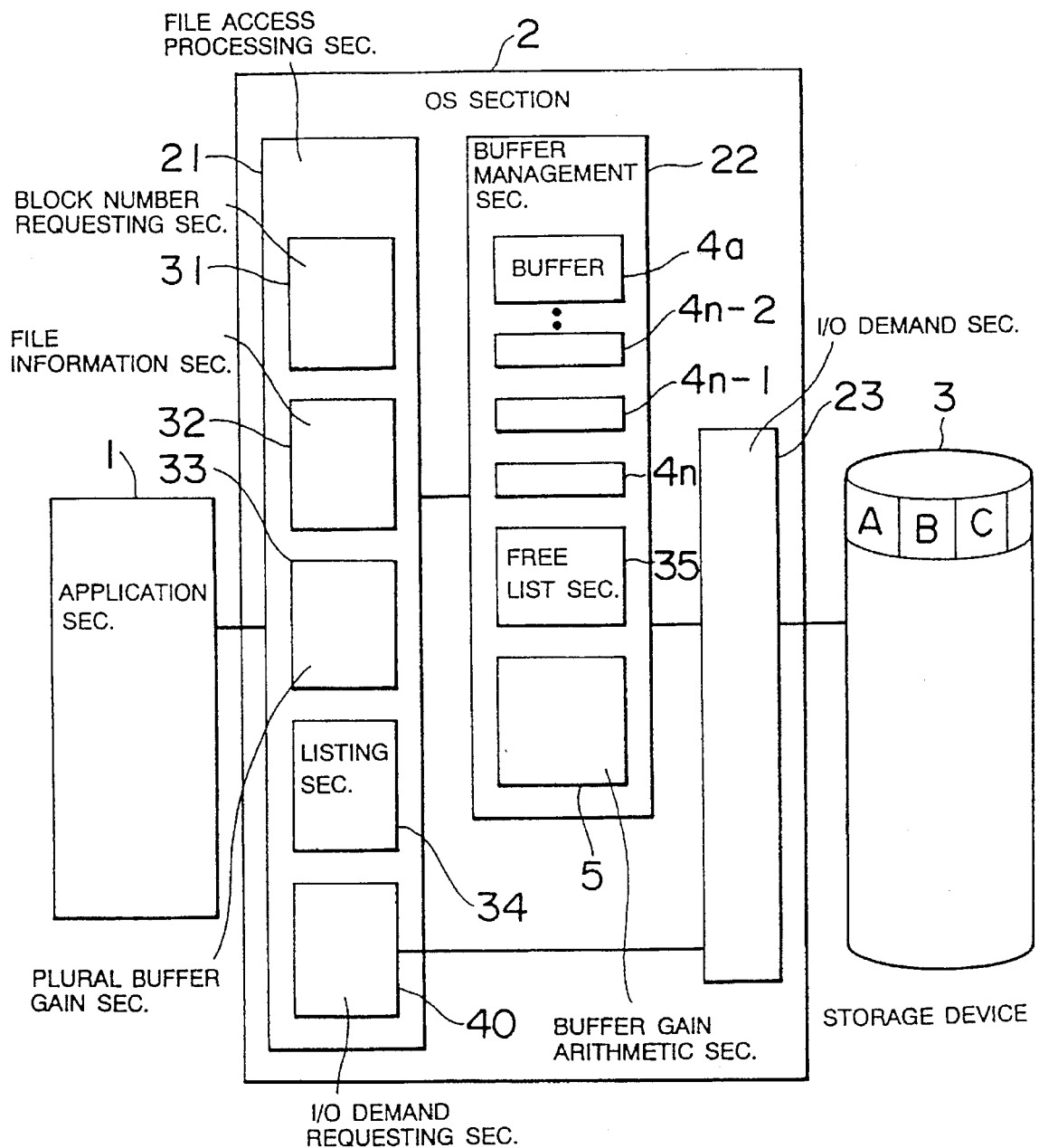
FIG. 4 is a block diagram showing a structure relating to a batch input process in a file management system according to a second embodiment of the invention.

FIG. 4 shows a file management system in accordance with a second embodiment of the invention, in which a batch input/output process is carried out in accordance with a batch input/out demand.

In FIG. 4, the file management system is provided with an application section 1, an operating system section (hereinafter referred to as "OS" section), a storage device 3 for forming a file system composed of a plurality of files each of which is composed of one or more blocks.

The application section 1 is a section for executing the application program. The application section 1 executes the application program inclusive of a data input (read) demand and a data output (write) demand.

The OS section 2 is coupled with the application section 1 and carries out an input process of the desired file data from the storage device 3 and/or an output process of the desired file data into the storage device 3 in accordance with a data input/output demand of the application section 1.

The OS section 2 includes a file access processing section 21, a buffer management section 22 and an input/output demand section 23.

The file access processing section 21 carries out an access process for the desired file on the basis of the input/output demand from the application section 1.

The file access processing section 21 is provided with a block number requesting section 31, a file management section 32, a plural buffer gain section 33, a listing section 34 and an input/output demand requesting section 40.

The buffer management section 22 has a plurality of buffers 4a–4n corresponding to a plurality of blocks. The buffer management section 22 is provided with a free list section 35 for listing buffers which have been filled with data blocks and other buffers which are not filled with data blocks (that is, kept under blank conditions) in the plurality of buffers and is further provided with a buffer gain arithmetic section 5.

The block number requesting section 31 requests the buffer gain arithmetic section 5 to seek the number of the blocks, which can be batch inputted, on the basis of the batch block input/output demand of the application section 1.

The file information section 32 manages a size of the files and the blocks and registers the block numbers included in the batch block input demand of the application section 1 as management information.

The buffer gain arithmetic section 5 calculates the batch buffer number by which the blocks may be actually inputted and demanded in a batch manner, on the basis of the number of the buffers kept under the blank conditions and listed in the free list section 35 in accordance with the batch block request from the block number requesting section 31.

In the embodiment, the buffer gain arithmetic section 5 calculate the result obtained as the actual batch buffer number, for example, by dividing the number of the blank buffers by the number of processes. These processes, i.e., tasks, change their values in accordance with the circumstances of the system.

The plural buffer gain section 33 gains the buffers relative to the blocks on the file on the basis of the number of the batch buffers calculated by the buffer gain arithmetic section 5.

The listing section 34 forms a batch list of the batch buffers obtained by the plural buffer gain section 33.

The input/output demand requesting section 40 sends a signal to the input/output demanding section 23 on the basis of the list structure.

The input/output demanding section 23 generate a batch input demand for the storage device 3 on the basis of the batch list structure formed by the listing section 34, inputs the plurality of blocks corresponding to the batch input demands from the desired file of the storage device 3, and feeds the plurality of blocks to the plurality of buffers. The file access processing section 21 feeds the plurality of blocks from the plurality of buffers to the application section 1 and releases the obtained buffers for the buffer management section 22.

Figure 5:
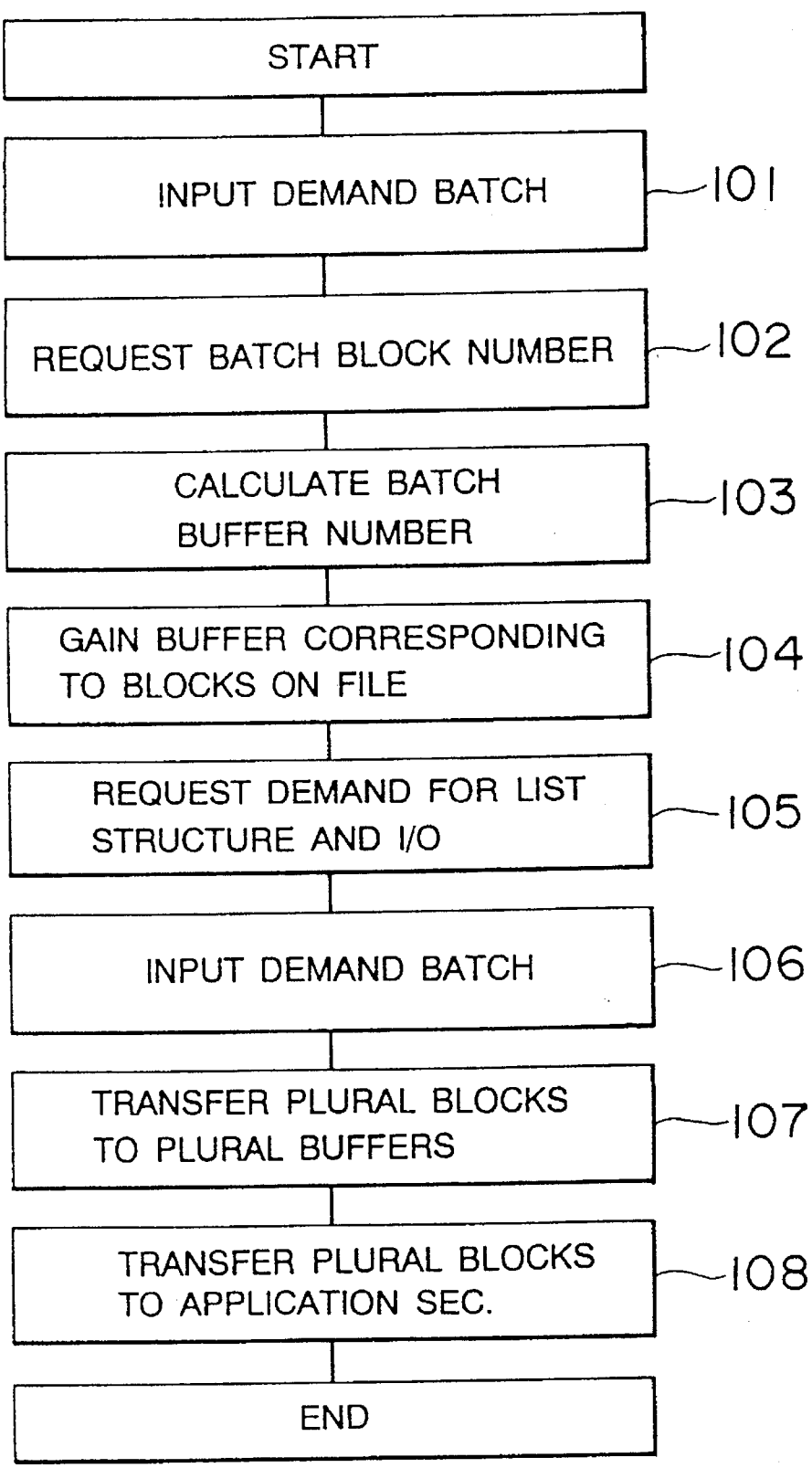
FIG. 5 is a flowchart showing the batch input process in accordance with the system shown in FIG. 4.

FIG. 5 is a flowchart showing a batch input process in the file management system in accordance with the second embodiment.

Referring now to FIGS. 4 and 5, the batch input process of the plurality of blocks is explained. The case where the application section 1 demands the blocks A, B and C is explained by way of example.

First of all, the application section 1 imparts a batch block input demand, including the block numbers A, B and C, to the file access processing section 21 (step 101). The block number requesting section 31 requests the buffer gain arithmetic section 5 to seek the block number by which the blocks may be input in a batch manner by the application section 1, on the basis of the batch input demands A, B and C (step 102). The file information section 32 registers into the management information the block numbers A, B and C included in the input demand.

The buffer gain arithmetic section 5 calculates the number of the batch buffer number which can be actually input in a batch manner on the basis of the number of the blank buffers listed in the free list section 35, in accordance with the request of the batch blocks from the block number requesting section 31, and a number obtained by dividing the batch buffer number by the number of the processes is regarded as a number of the batch buffers (step 103). In this embodiment, assuming, for example, that the number of the blank buffers is three or more and the number of the processes is one, the batch buffer number which can be actually inputted is three.

The plural buffer gain section 33 gains, for example, buffers 4n-2, 4n-1 and 4n as the plurality of buffers for the blocks A, B and C on the file on the basis of the batch buffer number calculated by the buffer gain arithmetic section 5 (step 104). Further, the listing section 34 forms a batch list structure of the batch buffers obtained in the plural buffer gain section 33 (step 105). The input/output demand requesting section 40 feeds the signal to the input/output demand section 23 on the basis of the list structure.

The input/output demanding section 23 generates the batch input demand to the storage device 3 on the basis of the batch list structure formed in the listing section 34 (step 106). When the batch input demand has been completed, the plurality of blocks A, B and C corresponding to the batch input demand from the desired file of the storage device 3 are inputted, and the plurality of blocks A, B and C are fed to the buffers 4n-2, 4n-1 and 4n (step 107).

The file access processing section 21 feeds blocks A, B and C from the buffers 4n-2, 4n-1 and 4n to the application section 1, and releases the obtained buffers 4n-2, 4n-1 and 4n (step 108). Then, the block numbers A, B and C are listed up in the free list section 35.

Thus, according to the batch input manner of the plurality of blocks, it is possible to realize the high speed access to the file without any enlargement of the block length of the file system and without any change to the available file system.

Figure 6:
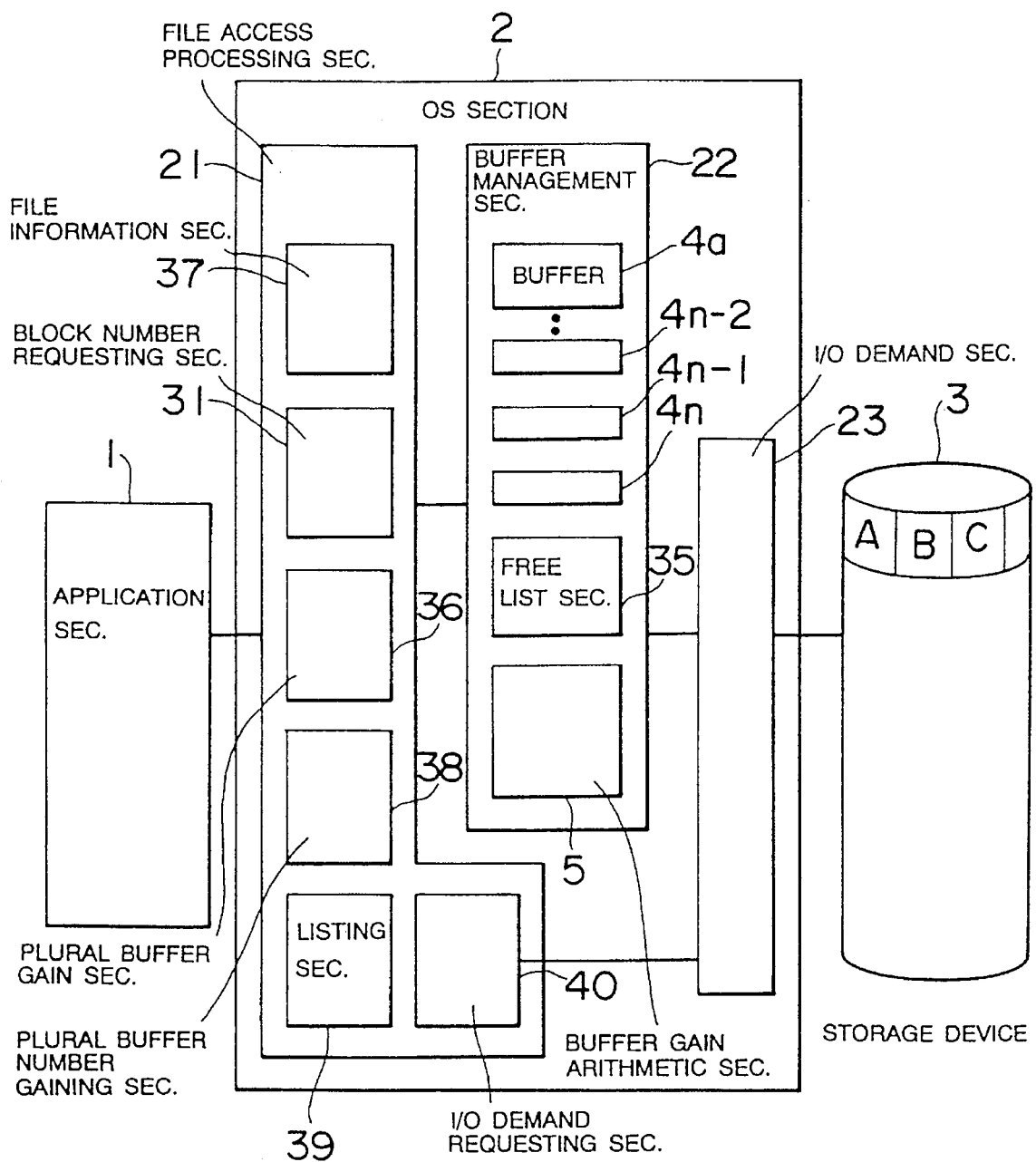
FIG. 6 is a block diagram showing a structure relating to a batch output process in a file management system in accordance with a second embodiment of the invention.

FIG. 6 is a block diagram showing a structure of a batch output in accordance with the second embodiment, in which the same reference numerals as those in FIG. 4 are used to represent the like components or members and the duplication of explanation will be omitted. Thus, the peculiar sections to the batch output process will be explained as follows.

The file access processing section 21 performs an allotting process for the files of the storage decide 3 upon the batch output period. Furthermore, the section 21 gains the buffer and rewrites the write data from the application section 1.

The file information section 37 links the obtained buffers and stores as the management information the linked buffer number, i.e., the added link number obtained by adding one to the link number. Thereafter, the obtained buffers are released and are linked to the free list section 35.

A buffer gain number determining section 38 determines whether or not the buffer number obtained by the buffer gain arithmetic section 5 is smaller than the link number within the file information section 37.

A listing section 39 forms a list structure in the case where the buffer gain number determining section 38 determines that the buffer number obtained in the buffer gain arithmetic section 5 is smaller than the link number within the file information section 37, clears the link number of the file information section 37 and separates all the linked buffers from the file information section and the free list section.

However, in the case where the determination is incorrect, as far as all the demands from the application section 1 are not met, the process is repeated again from the block allotting process. The listing section 39 requires an output demand to the input/output demand section 23.

The input/output demand section 23 generates an output demand to the storage device 3, and outputs a write completion to the access processing section 21 when the write data have been written to the storage device 3. The file accessing section 21 releases the buffers gained for the buffer management section 22.

Figure 7:
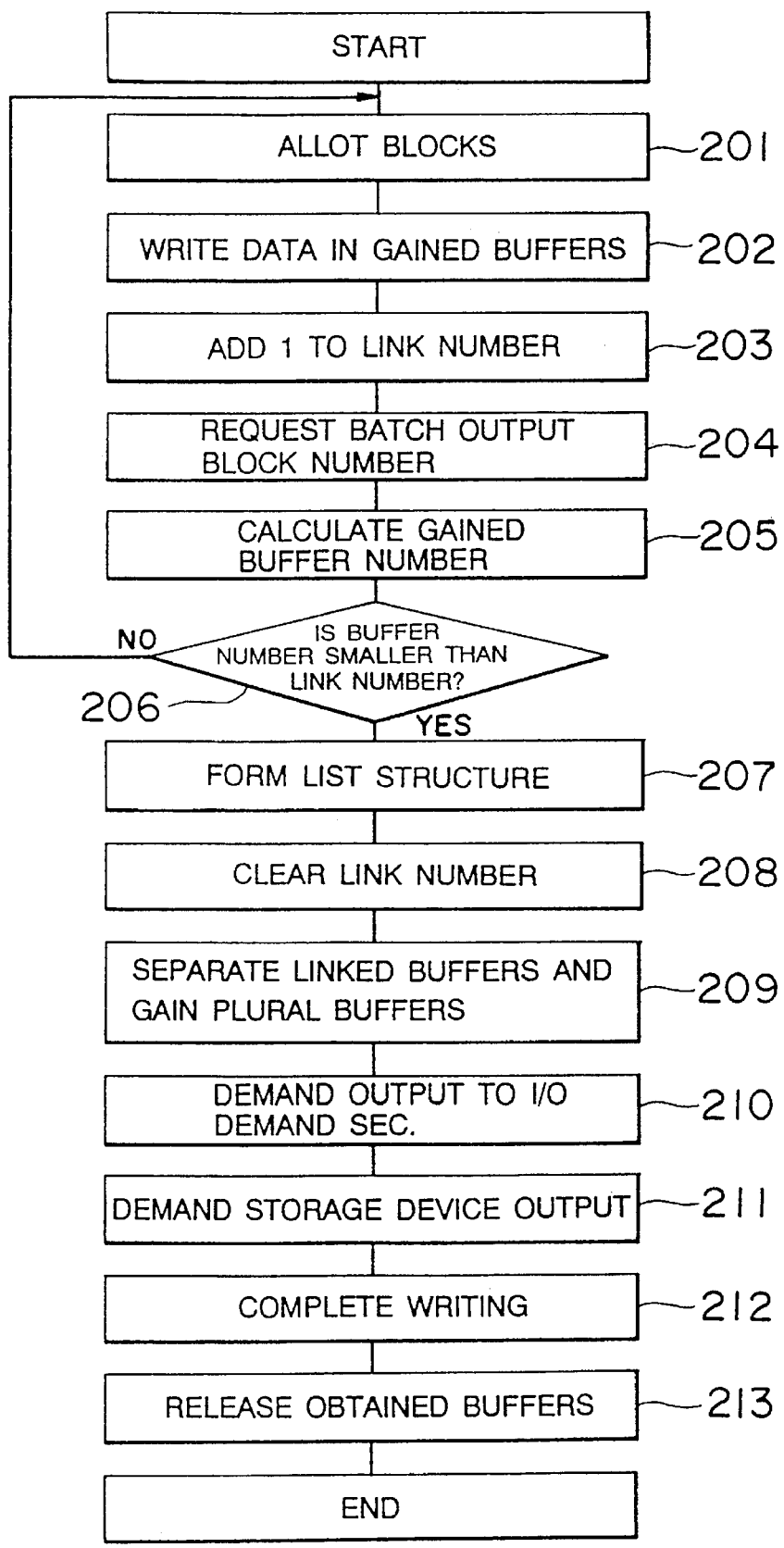
FIG. 7 is a flowchart showing the batch output process in accordance with the system shown in FIG. 6.

The batch output process in accordance with the second embodiment is explained. FIG. 7 is a flowchart showing the batch output process in accordance with the second embodiment. First, an output demand from the application section 1 is fed to the file access processing section 21. Then, the file access processing section 21 processes the block allotment for the files of the storage device 3 (step 201).

Gaining the buffers for the allotted blocks, the write data from the application section are written into the buffers (step 202). Further, the buffers are linked by the file information section 37, one is added to the link number and the added link number is stored (step 203). Thereafter, the gained buffers are released to the free list section 35. Subsequently, the block number requesting section 31 requests the buffer gain arithmetic section 5 to seek the number of blocks which may be output in a batch manner by the application section 1 (step 204 ). In accordance with the batch block request from the block number requesting section 31, the buffer gain arithmetic section 5 calculates the batch buffer number which may be actually outputted in a batch manner on the basis of the number of the blank buffers listed in the free lest section 35, and regards as a batch buffer number the number obtained by dividing the calculated number by the process number (step 205). In this embodiment, the batch buffer number is three, for example.

The buffer gain number determining section 38 determines whether or not the buffer number obtained in the buffer gain arithmetic section 5 is smaller than the link number in the file information section 37 (step 206).

When the buffer gain number determining section 38 determines that the buffer number obtained by the buffer gain arithmetic section 5 is larger than the link number within the file information section 37, the process is returned to step 201 to perform steps 201–206.

On the other hand, when the buffer gain number determining section 38 determines that the buffer number obtained by the buffer gain arithmetic section 5 is smaller than the link number within the file information section 37, for example, A, B and C are registered in the file information section 37 and the link number becomes three. Also, blocks A, B and C are written in the buffers 4n–2, 4n–1 and 4n.

The listing section 39 forms a list structure of the block numbers A, B and C (step 207). Further, the listing section 39 clears the link number of the file information section 37, and simultaneously separates all the linked buffers from the file information section 37 and the free list section 35. Then, the listing section 39 demands an output demand to the input/output demanding section 23 (step 210).

The input/output demanding section 23 generates an output demand to the storage device 3 (step 211), and input the write completion when the write data have been written in the storage device 3 (step 212). Further, the file access processing section 21 releases the obtained buffer to the buffer management section 22 (step 213).

With such a plural block batch output, it is possible to perform a high speed access to the files without enlarging the block length of the file system and without changing the available file system.

A third embodiment of the invention is now be described. The third embodiment performs a release/gain process of the blocks.

Figure 8:
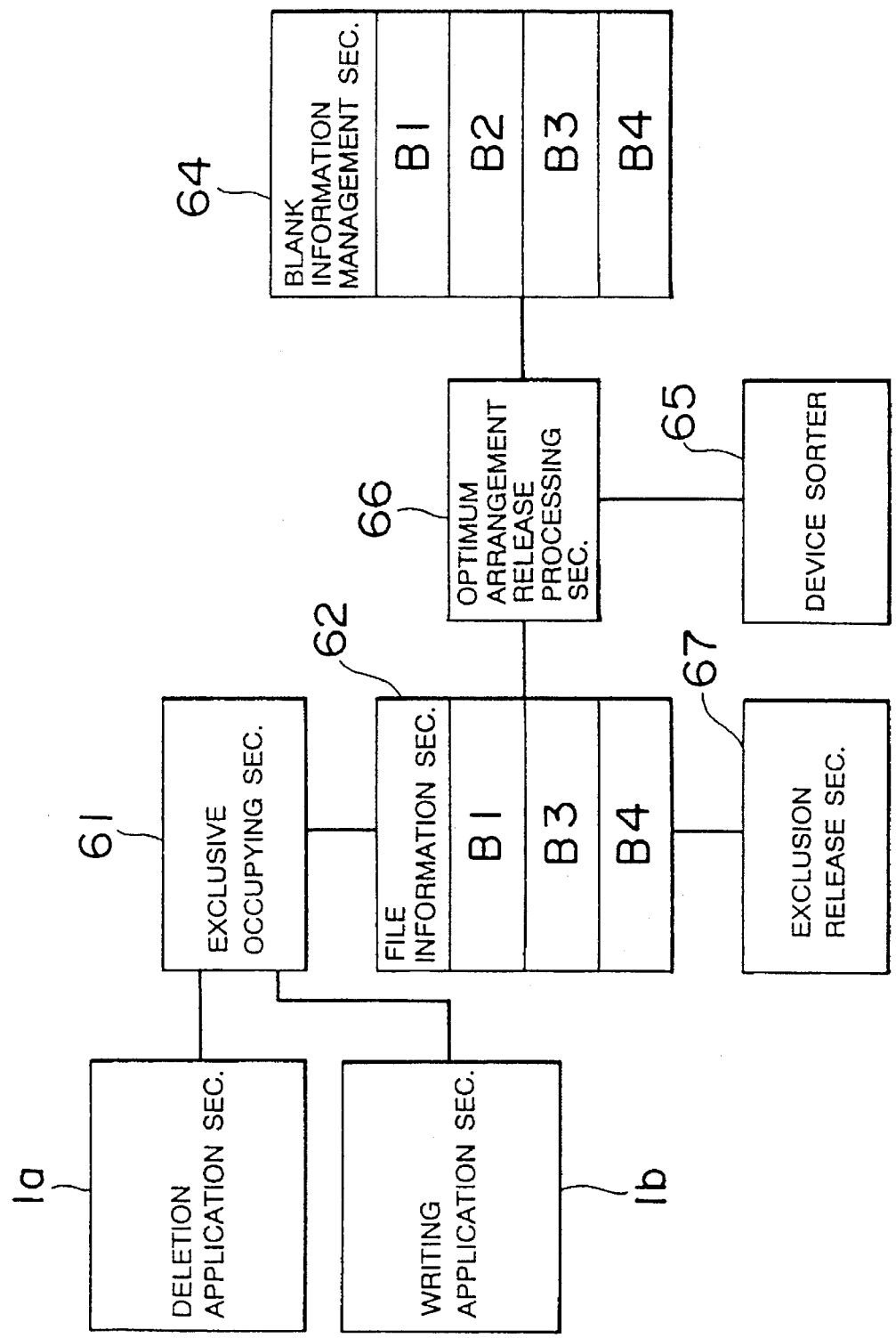
FIG. 8 is a block diagram showing a block release process in the file management system in accordance with a third embodiment of the invention.

FIG. 8 is a block diagram showing a structure in a block release state in accordance with the third embodiment.

Figure 9:
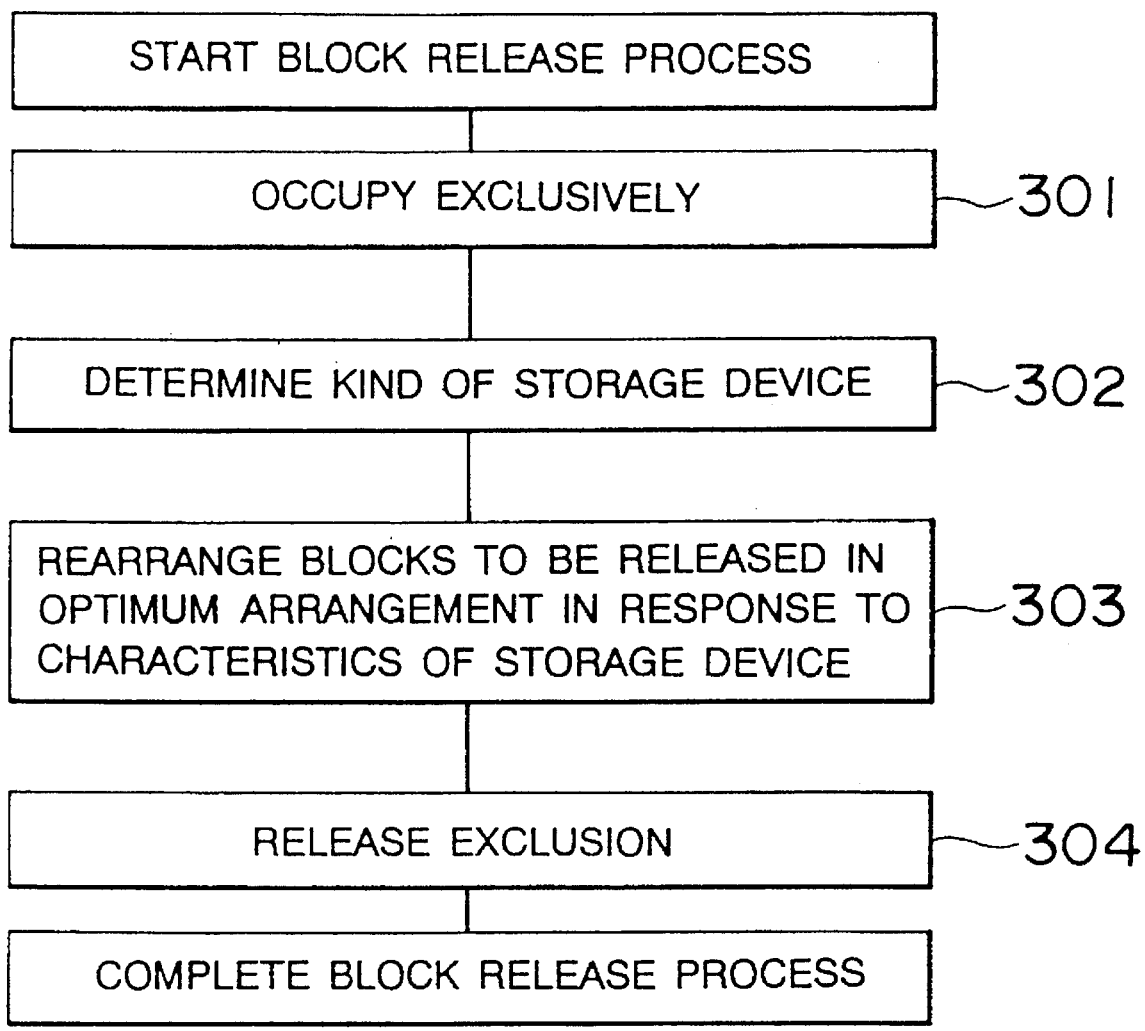
FIG. 9 is a flowchart showing the block release process shown in FIG. 8.

The process in the block release state is explained with reference to FIGS. 8 and 9. The structure is provided with a deletion application section 1a for deleting files and write application section 1b for rewriting files.

First, the block release process is started. Subsequently, an exclusive occupation section 61 executes an exclusive occupation of the deletion application section 1a of the two application sections 1a and 1b (step 301). At this time, block numbers B1, B3 and B4 are registered in a file information section 62.

Subsequently, a device type section 65 performs determination of the type of the storage device 3 (step 302). The type refers to kinds of the storage device such as a disk device, a floppy disk device, an magneto-optical disk device and the like. Further, an optimum arrangement release processing section 66 rearranges the blocks B1, B3 and B4 of the file information section 62 to be released (or deleted) and blank block number B2 of a management information section 64 for optimum arrangement (step 303).

As a result, the block numbers are registered in the blank management information section 34 with a correct order such as B1, B2, B3 and B4.

Subsequently, an exclusion releasing section 67 releases the exclusive occupation of the deletion application section 1a and operates the write application section 1b (step 304). When the foregoing steps have been completed, the block release process is finished.

Figure 10:
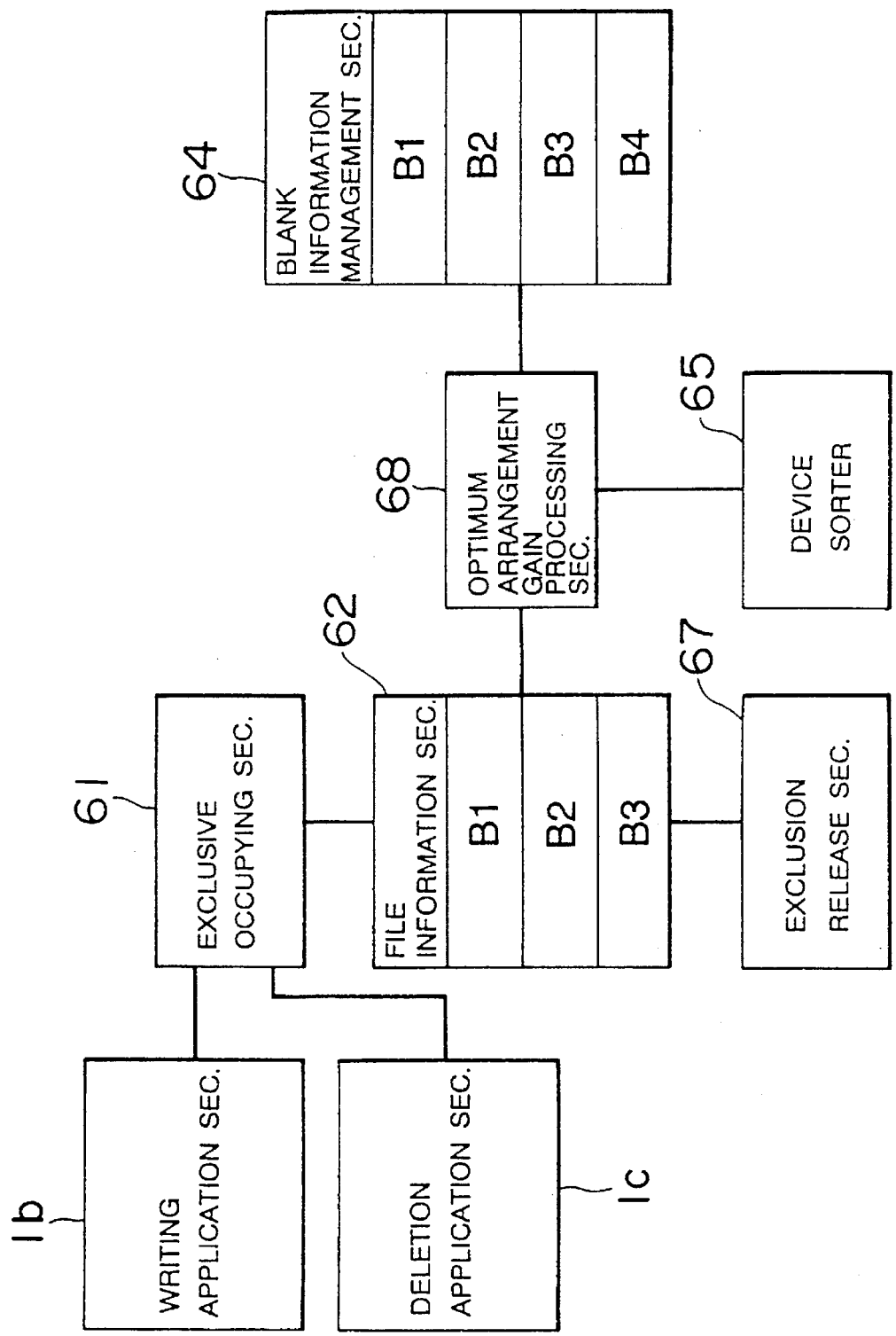
FIG. 10 is a block diagram showing a structure of the block gain process in accordance with the third embodiment of the invention.
Figure 11:
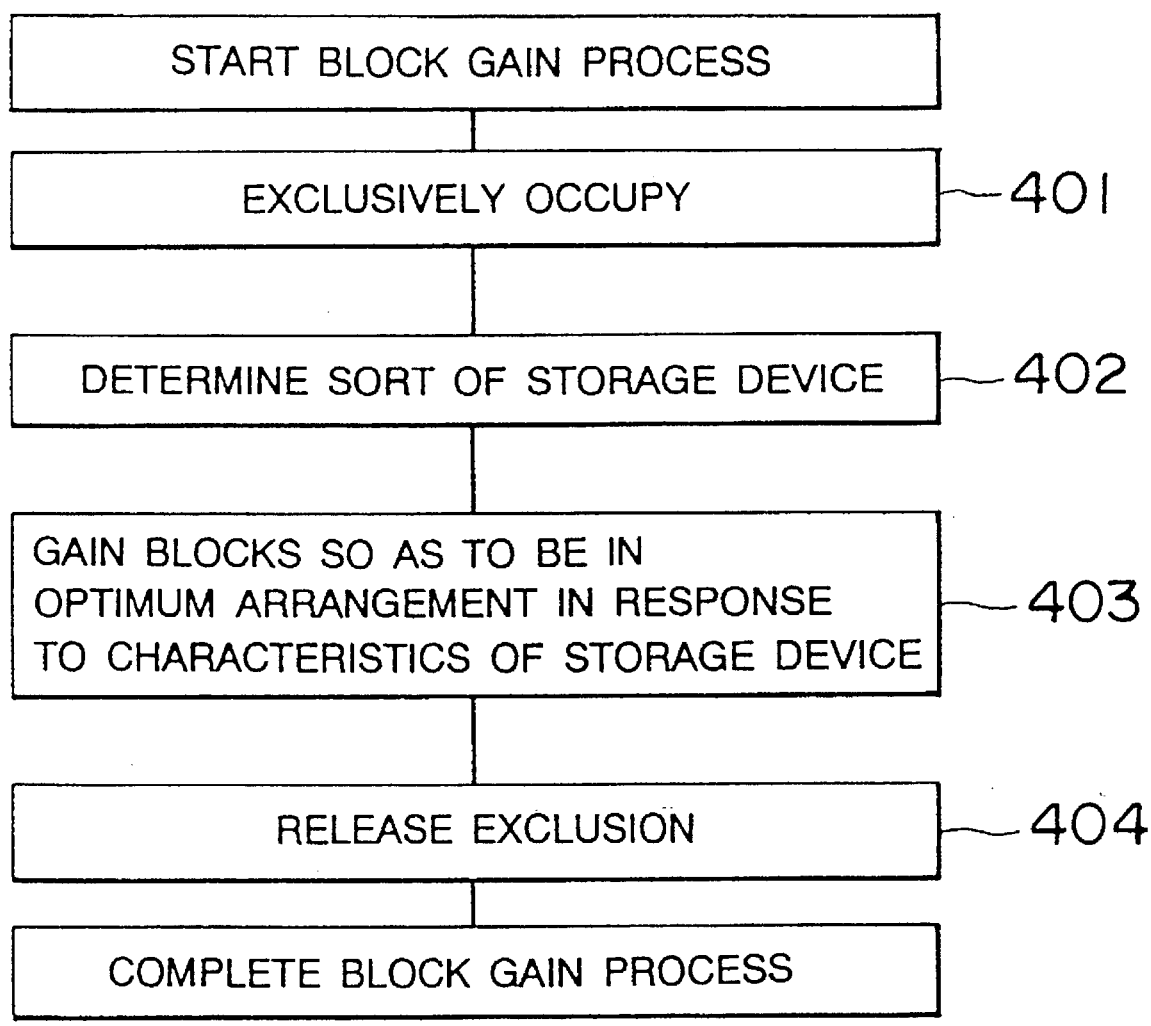
FIG. 11 is a flowchart showing the block gain process shown in FIG. 10.

A block gain process is explained. FIG. 10 is a block diagram showing a structure in a block gain in accordance with the third embodiment. FIG. 11 is a flowchart showing the process in block gain in accordance with the third embodiment.

The structure is provided with the writing application section 1b for additionally writing the files and a deletion application section 1c for deleting the files. The block gain process for the case where the writing addition steps are to be carried out by the writing application section 1b is explained.

When the writing application section 1b is operated by the above-described exclusive releasing section 67, the block gain process is started.

The exclusive occupation section 61 executes the exclusive occupation of the writing application section 1b of the two application sections 1c and 1b (step 401). At this time, no block is gained in the file information section 62.

Subsequently, the device type section 65 determines the type of the storage device 3 (step 402). Further, the optimum arrangement gain processing section 68 rearranges the blocks to be obtained from the blank management information section 64 for an optimum arrangement in accordance with the type of the storage device 3 determined by the deice type section 65 (403).

The block numbers are registered to be arranged in a correct order such as B1, B2 and B3 in the file information section 62.

Subsequently, the exclusion release section 67 releases the exclusive occupation of the writing application section 1b (step 404). When the above-described steps have been completed, the block gain process is finished.

Thus, according to the third embodiment, since the blank management information of the file system is rearranged so that the optimum arrangement of the individual blocks may be obtained in response to the characteristics of the storage device 3, it is possible to access the files at a higher speed.

As explained in conjunctions with the second and third embodiments, it is possible to perform high speed access to the files by the batch input/output of a plurality of blocks without enlarging the block length and without changing the available file system. Thus, it is possible to dispense with the reformation of the file system and the transfer work therefor.

Also, since the unit of the input/output may be automatically changed by adjusting the buffer number, the tuning of the performance is possible.

Since the blank management information is rearranged so that the optimum arrangement is obtained for individual blocks in response to the characteristics of the storage device 3, it is possible to perform a higher speed access to the files.

What is claimed is:

1. A file management method comprising the steps of:
   generating a batch transfer demand for demanding a storage device storing one or more files, each file comprising a plurality of data blocks, each data block comprising data having a constant length, said batch transfer demand transferring and processing the data in a batch manner;
   gaining a plurality of buffers needed for transferring the plurality of data blocks; and transferring and processing the data between said storage device and a plurality of buffers, each buffer corresponding to one of the plurality of data blocks and temporarily storing the data being transferred, listing the plurality of data blocks into the plurality of buffers if a number of the plurality of data blocks exceeds a number of the plurality of buffers gained for transferring the plurality of data blocks, and concurrently transferring and processing the data between a batch transfer demand section demanding the batch transfer and said plurality of buffers in the batch manner, said data being transferred and processed based on said batch block transfer demand generated in said generating step.

2. A method according to claim 1, wherein said transferring and processing step comprises the steps of:

calculating a buffer number of blank buffers of said plurality of buffers for gaining the plurality of buffers which are actually needed for inputting the data of said plurality of blocks in the batch manner in accordance with said batch block input demand in said batch input demand; and gaining the plurality of buffers corresponding to the buffer number calculated by said calculating step, and inputting corresponding data blocks into the buffers gained, respectively.

3. A method according to claim 2, wherein said step of calculating the buffer number of blank buffers calculates a batch number of the batch buffers by dividing the buffer number by a number of processes.

4. A file management method comprising the steps of:

generating a batch input demand for demanding inputting of data of a plurality of blocks in a batch manner from a storage device storing therein at least one or more files, each of the files comprising a plurality of data blocks each of the data blocks comprising data having a constant length;

gaining a plurality of buffers needed for transferring the plurality of data blocks; and transferring and processing the data of said plurality of blocks between a plurality of buffers, each of the buffers corresponding to one of the plurality of data blocks and temporarily storing the data being input and said storage device, listing the plurality of data blocks into the plurality of buffers if a number of the plurality of data blocks exceeds a number of the plurality of buffers gained for transferring the plurality of data blocks, and concurrently transferring and processing the data of said plurality of blocks between a batch input demand section and said plurality of buffers in the batch manner, said data of said plurality of blocks being transferred and processed based on said batch block input demand generated in said generating step.

5. A file management method comprising the steps of:

generating a batch output demand for demanding outputting of data of a plurality of blocks in a batch manner to a storage device storing therein at least one files, each of the files comprising a plurality of data blocks, each data block comprising data having a constant length;

gaining a plurality of buffers needed for transferring the plurality of data blocks; and transferring and processing the data of said plurality of blocks between a plurality of buffers, each buffer corresponding to one of the plurality of data blocks and temporarily storing the data being output and said storage device, listing the plurality of data blocks into the plurality of buffers if a number of the plurality of data blocks exceeds a number of the plurality of buffers gained for transferring the plurality of data blocks, and concurrently transferring and processing the data of said plurality of blocks between a batch output demand section and said plurality of buffers in a batch manner, said data of said plurality of blocks being transferred and processed based on said batch block output demand generated in said generating step.

6. A method according to claim 5, wherein said transferring and processing step comprises the steps of:

calculating a buffer number of blank buffers of said plurality of buffers for gaining the plurality of buffers which are actually needed for outputting the data of said plurality of blocks in the batch manner in accordance with said batch block output demand; and gaining the plurality of buffers corresponding to the buffer number calculated by said calculating step, and inputting corresponding data blocks into the buffers gained, respectively.

7. A method according to claim 6, wherein said step of calculating the buffer number of blank buffers step calculates a batch buffer number of the batch buffers by dividing the buffer number by a number of processes.

8. A method according to claim 5, further comprising the steps of:

managing an arrangement of blank blocks in said storage device in accordance with blank management information;

determining characteristics of said storage device; and controlling the blank management information for an optimum arrangement of individual blocks in response to characteristics determined in said determining characteristics step.

9. A method according to claim 6, wherein said batch transfer processing step comprises the steps of:

writing write data into the plurality of buffers in order, managing a number of the plurality of buffers to be written each time, and determining whether the number of the plurality of buffers to be written is larger than the buffer number calculated in the calculating step if the output demand is fed from the batch output demand section;

if said determining step determines that the number of the plurality of buffers to be written is larger than the buffer number calculated in the calculating step, listing the blocks written in the buffers; and outputting in the batch manner the plurality of blocks in a list structure listed in said listing the blocks step.

10. A file management apparatus comprising:

storage means for storing one or more files, each of the files comprising a plurality of data blocks, each data block comprising data having a constant length;

batch transfer demand means for generating a batch transfer demand demanding said storage means to transfer and process the data;

a plurality of buffer means for temporarily storing the data being transferred, each buffer means corresponding to one of said plurality of data blocks; and batch transferring and processing means for batch transferring and processing the data between said batch transfer demand means and the plurality of buffer means, and, concurrently, for batch transferring and processing the data between said plurality of buffer means and said storage means, based on said batch block transfer demand generated by said batch transfer demand means, said plurality of data blocks being listed into the plurality of buffer means if a number of the plurality of data blocks exceeds a number of the plurality of buffer means.

11. A file management apparatus comprising:

storage means for storing therein one or more files, each of the files comprising a plurality of data blocks, each data block comprising data having a constant length;

batch input demand means for generating a batch input demand for demanding said storage means to input the data of said plurality of data blocks;

a plurality of buffer means for temporarily storing the data being input, each of the plurality of buffer means corresponding to one of said plurality of data blocks; and batch transferring and processing means for batch transferring and processing the data of said plurality of blocks between said batch input demand means and said storage means, and concurrently, for batch transferring and processing the data of said plurality of blocks between said plurality of buffer means and said storage means, based on said batch block input demand by said batch input demand means, said plurality of data blocks being listed into the plurality of buffer means if a number of the plurality of data blocks exceeds a number of the plurality of buffer means.

12. An apparatus according to claim 11, wherein said batch transferring and processing means comprises:

blank buffer calculating means for calculating a buffer number of blank buffers of said plurality of buffer means for gaining a buffer capacity which is actually needed for inputting the data of said plurality of blocks in the batch manner in accordance with said batch block input demand of said batch input demand means; and buffer gaining means for gaining the buffer means corresponding to the buffer number calculated by said blank buffer number calculating means, and inputting the corresponding data blocks into the buffer means gained, respectively.

13. An apparatus according to claim 12, wherein said blank buffer number calculating means comprises means for calculating a batch number equal to a number of the plurality of buffer means for the batch process, said batch number obtained by dividing the number of the plurality blank buffer means being sought by a number of processes.

14. An apparatus according to claim 12, wherein said blank buffer number calculating means comprises means for calculating a batch buffer number equal to a number of the plurality of buffer means for the batch process, said batch buffer number obtained by dividing the number of the plurality of blank buffer means being sought by a number of the processes.

15. A file management apparatus comprising:

storage means for storing therein one or more files, each of the files comprising a plurality of data blocks each data block comprising data having a constant length;

batch output demand means for generating a batch output demand for demanding said storage means to output the data of said plurality of data blocks;

a plurality of buffer means for temporarily storing the data being output, each of the plurality of buffer means corresponding to one of said plurality of data blocks; and batch transferring and processing means for batch transferring and processing the data of said plurality of blocks between said batch output demand means and said storage means, and concurrently, for batch transferring and processing the data of said plurality of blocks between said plurality of buffer means and said storage means, based on said batch block output demand by said batch output demand means, said plurality of data blocks being listed into the plurality of buffer means if a number of the plurality of data blocks exceeds a number of the plurality of buffer means.

16. An apparatus according to claim 15, wherein said batch transferring and processing means comprises:

blank buffer calculating means for calculating a buffer number of blank buffers of said plurality of buffer means for gaining a buffer capacity which is actually needed for outputting the data of said plurality of blocks in the batch manner in accordance with said batch block input demand of said batch input demand means; and buffer gaining means for gaining the buffer means corresponding to the buffer number calculated by said blank buffer number calculating means, and outputting corresponding data blocks into the buffer means gained thereby, respectively.

17. An apparatus according to claim 15, further comprising:

blank management means for managing an arrangement of blank blocks in said storage means in accordance with blank management information;

determining means for determining characteristics of said storage means; and management controlling means for rearranging blank management information managed by said blank management means for optimum arrangement of individual blocks in response to the characteristics determined in said determining means, if one of block gain and release operations is executed by said batch transferring and processing means.

18. An apparatus according to claim 15, wherein said batch transfer processing means comprises:

buffer means number calculating means for calculating a buffer means number;

means for writing write data into the plurality of buffers in order, managing a number of the plurality of buffer means to be written each time, and determining whether the number of the buffer to be written is larger than the buffer means number calculated by the buffer means number calculating means, if the output demand is transmitted from said batch output demand means;

listing means for listing the blocks written in the plurality of buffers if said buffer means number calculating means determines that the written buffer means is larger than the calculated buffer means; and outputting means for outputting in the batch manner the plurality of blocks in a list structure listed by said listing means.

* * * * *